C. P. MACOWITZKY.
Vibrating-Propellers.
No. 158,101. Patented Dec. 22, 1874.
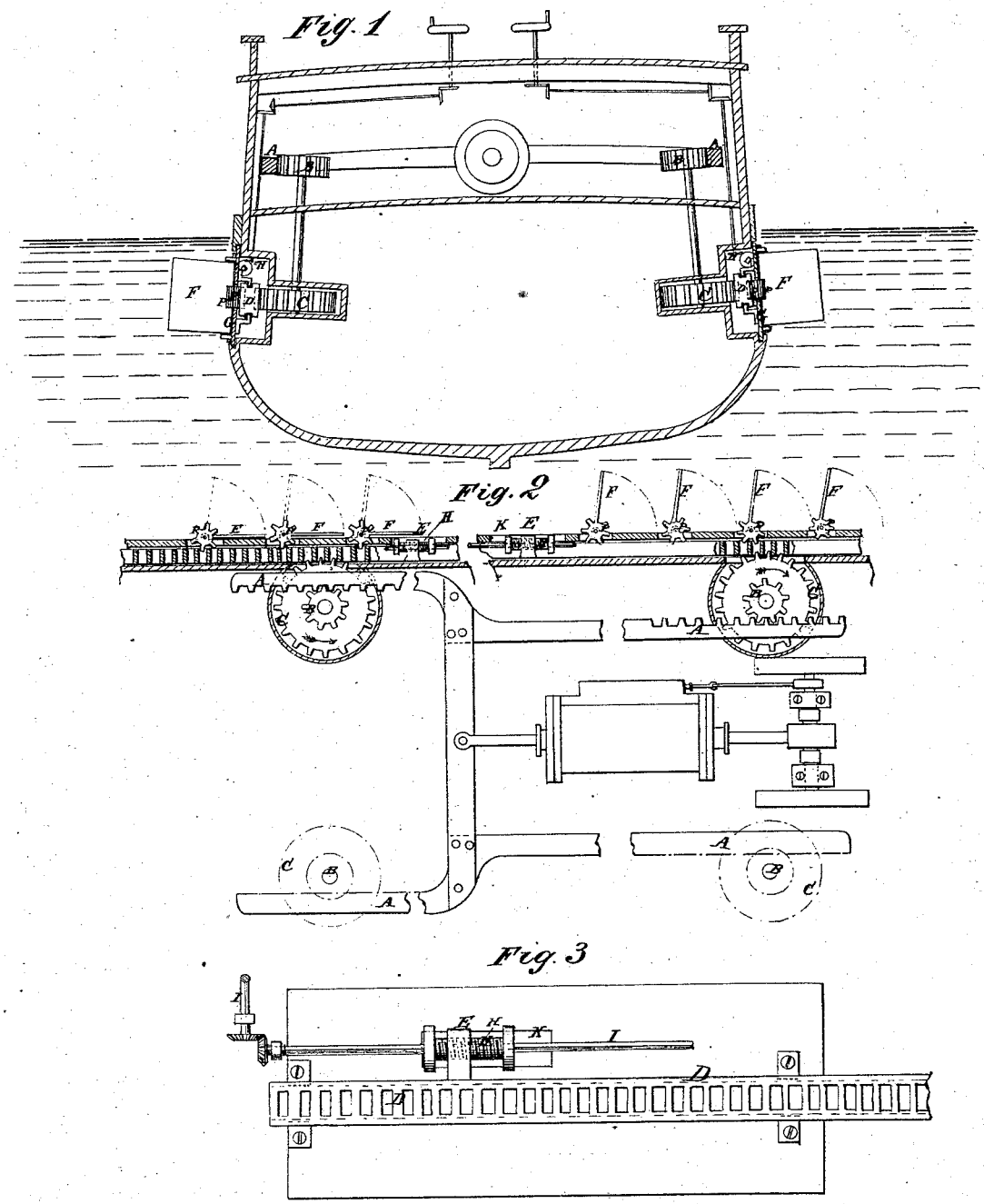
WITNESSES:
A. W. Almqvist
Alex F. Roberts
INVENTOR:
C. P. Macowitzky
BY
Munn & Co
ATTORNEYS.

UNITED STATES PATENT OFFICE.

CHARLES P. MACOWITZKY, OF CORPUS CHRISTI, TEXAS.

IMPROVEMENT IN VIBRATING PROPELLERS.

Specification forming part of Letters Patent No. 158,101, dated December 22, 1874; application filed May 16, 1874.

*To all whom it may concern:*

Be it known that I, CHARLES P. MACOWITZKY, of Corpus Christi, in the county of Nueces and State of Texas, have invented a new and useful Improvement in Vibrating Propellers, of which the following is a specification:

Figure 1 is a cross-section of my improved device. Fig. 2 is a detail longitudinal section. Fig. 3 is a detail view of the sliding plate and shifting device.

Similar letters of reference indicate corresponding parts.

The invention is an improvement on the propellers for which I obtained Letters Patents Nos. 135,994 and 146,009; and it relates to the arrangement of the sliding-frame, to which the paddles are pivoted with relation to the side or shell of the boat or other vessel, and to the rack-bar by which the paddles are vibrated, as hereinafter described.

A represents the rack-bar connected with the motive power, and is geared with a strong pinion-wheel, B, which is thereby turned in both directions. Its shaft extends and is secured to a larger gear-wheel, C, which wheel is incased and passes through the skin or side of the vessel, and is geared with adjustable rack-bar D. The teeth of said rack-bar may pass entirely through to the outside thereof, and engage with the teeth of small gear-wheels or segments P attached to or formed upon the base of the paddles F, or may have teeth upon both sides. The said paddles are securely pivoted to the outside of the sliding frame G, which is pierced at places to admit the teeth of the small gear-wheels or segments to work and mesh into the teeth of the rack-bar D. This arrangement of the rack-bar D prevents its entanglement with ropes, or contact with floating or stationary objects, whereby injury would result, or its operation be impeded. The reciprocating movement of the rack-bar D upon the sliding frame G is limited by adjustable stops connected with the arm E, which arm is firmly connected with the rack-bar D, has a threaded hole formed through it, through which a correspondingly-threaded sleeve or socket, H, is screwed, and which has flanges, nuts, or other stops on its ends. The length of said sleeve is regulated according to the diameter of the small gear-wheels or segments P. I is a square or feathered rod, which has a screw or pinion wheel formed at its center, and may be swiveled at the ends and center. The rod I passes through a square hole formed longitudinally in the sleeve H. The arm E and socket or sleeve H enter a slot, K, in the sliding frame. This slot may have elastic stops on each end. The slot is longer than the sleeve H to allow the paddles to open or close at the proper time of the stroke without loss or resistance. The rack-bar and sliding frame may be guided by rails or grooves provided with friction-rollers or wheels, in order to insure the proper connection of all the gearing. The paddles are reversed by turning the sleeve H by means of the rod I. This will change the relative position of the arm E with the sliding frame G, and force the paddles F to operate as desired. By reversing the paddles upon one side, the vessel may be turned in a very small space—almost upon her axis. The rod I may be turned by suitable gearing from the pilot-house. A vessel with this system of propulsion will be enabled to avail herself of winds, and go under sail entirely, if so desired, as my device does not interfere with the vessel's sailing. The double-elbow rack-bars upon each side of the vessel may be connected by a cross-bar, so as to be operated by a single engine, or each rack-bar may be operated by an independent engine, as may be desired.

Having thus described my invention, I claim as new and desire to secure by Letters Patent—

The combination of the sliding slotted frame G, carrying the hinged paddles F with toothed segments P, and arranged flush with, or exterior to, the side of the vessel, and the sliding rack D, arranged behind and contiguous to said frame, all as shown and described.

CHARLES P. MACOWITZKY.

Witnesses:
 JAMES T. GRAHAM,
 T. B. MOSHER.